United States Patent
Carter et al.

(10) Patent No.: US 8,156,425 B2
(45) Date of Patent: Apr. 10, 2012

(54) USER INTERFACE (UI) DIMENSIONING

(75) Inventors: Benjamin F. Carter, Redmond, WA (US); Cedric P. Dussud, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 12/132,618

(22) Filed: Jun. 4, 2008

(65) Prior Publication Data
US 2009/0307586 A1 Dec. 10, 2009

(51) Int. Cl.
G06F 17/00 (2006.01)
G06F 7/00 (2006.01)
(52) U.S. Cl. .................... 715/243; 715/762
(58) Field of Classification Search .............. None
See application file for complete search history.

(56) References Cited

U.S. PATENT DOCUMENTS

| 6,091,416 | A  | * | 7/2000  | Cragun ............ 715/837 |
| 6,297,837 | B1 |   | 10/2001 | Bogdan |
| 7,152,211 | B1 |   | 12/2006 | Fernandez et al. |
| 7,246,326 | B2 |   | 7/2007  | Haley |
| 7,328,411 | B2 |   | 2/2008  | Satanek |
| 7,707,494 | B2 | * | 4/2010  | Ohta ............ 715/243 |
| 2004/0046805 | A1 |   | 3/2004 | Brand et al. |
| 2005/0071753 | A1 |   | 3/2005 | Klein et al. |
| 2005/0229110 | A1 |   | 10/2005 | Gegner et al. |
| 2005/0289450 | A1 |   | 12/2005 | Bent et al. |
| 2006/0218489 | A1 |   | 9/2006  | Ovetchkine et al. |
| 2006/0253775 | A1 |   | 11/2006 | Ovetchkine et al. |
| 2006/0277469 | A1 |   | 12/2006 | Chaudhri et al. |
| 2007/0055782 | A1 |   | 3/2007  | Wright et al. |
| 2007/0136268 | A1 | * | 6/2007  | Qureshi et al. ............ 707/4 |

OTHER PUBLICATIONS

"CSS3 Basic User Interface Module", Date: Jul. 3, 2003, 34 Pages. http://www.w3.org/TR/2003/WD-css3-ui-20030703/.
Heilmann, "Monitoring Element Size and Position with the YUI", http://www.wait-till-i.com/2007/08/28/monitoring-element-size-and-position-with-the-yui/.

* cited by examiner

Primary Examiner — Tim T Vo
Assistant Examiner — Sangwoo Ahn
(74) Attorney, Agent, or Firm — Microsoft Corporation

(57) ABSTRACT

Determining a total dimension of items in computer-based user interface control (e.g., non-uniform items displayed in grid-view), may be accomplished by determining an estimated dimension value (e.g., for all items in a series) and combining (e.g., multiplying) that value with a total number of items (e.g., items in the series). If a viewport offset value and viewport item value is known, and/or a previously realized dimension and previously realized item value is known, the estimated dimension value may be determined by combining one or more of these values with values for realized items. Otherwise, the estimated dimension value can be determined by dividing the realized items dimensions value by the number of realized items. A total dimension value may be used by a user interface element, for example, to calculate an appropriate size and location of a scroll bar display.

20 Claims, 7 Drawing Sheets

USER INTERFACE (UI) DIMENSIONING

BACKGROUND

In a computing environment, data items may be stored and displayed in a variety of techniques. Commonly, user interface (UI) elements display stored data items in list-view, grid-view, and tree-view, for example. These UI elements can contain many data items (e.g., thousands), but may only be able to display a small fraction of the items on a computer screen at one time, for example. Those items displayed on the screen may be called "realized," while the remaining items may be called "virtualized."

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In a computing environment, user interface (UI) elements can contain items that may be displayed in on a computer display screen, for example. List-view, grid-view, and tree-view are examples of common element control displays for viewing items in the UI element. While a UI element may contain many data items, for example, a computer system may only be able to display a portion of the items at any one time.

Typically, users may scroll through the data items, and the UI element displays them while scrolling. However, in order to preserve computer resources and provide a faster user experience, the controls may only convert data items that are visible in a viewport to displayed onscreen representations (realized). Items that are not realized (e.g., items that have not been displayed in the viewport), or have been previously realized (e.g., were previously displayed in the viewport), may be "virtualized" by the control in order for certain processes to function correctly. For example, a scrolling process may need to have a total dimension of all the items in a series in order to generate an appropriate scroll (e.g., a sized slider bar) function in the UI element.

If the items have not been realized, the control may need to estimate the total dimension of those not yet realized. Typical systems that use these types of UI elements utilize uniform sizes for items, such that the UI element would be able to determine the total dimension for the items by multiplying the total number of items by the uniform dimension size. However, if a UI element allows respective items to have non-uniform dimensions, then dimension of the virtualized items may not be readily determined using this method.

As provided herein, total dimension of items in computer-based user interface controls are determined, for example, where items may be of non-uniform dimensions. An estimated dimension value, for example, for all items in a series (e.g., a series of columns of items) can be determined by combining known dimension values with known numbers of items. If a viewport offset value and a number of viewport offset items is known, the estimated dimension value may be determined by combining these values with realized item values (e.g. a combination of the viewport offset value and the realized items' dimension value, divided by a combination of the viewport offset item number and the realized item number). Additionally, for example, values for previously represented items may be used to determine the estimated dimension value. Otherwise, in this example, the average dimension value can be determined by dividing the realized items dimensions value by the number of realized items. Once the estimated dimension value is determined, it can be multiplied by a total number of items (e.g., in a series of items, such as a series of rows of items) to generate a total dimension value for items in a series of items, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
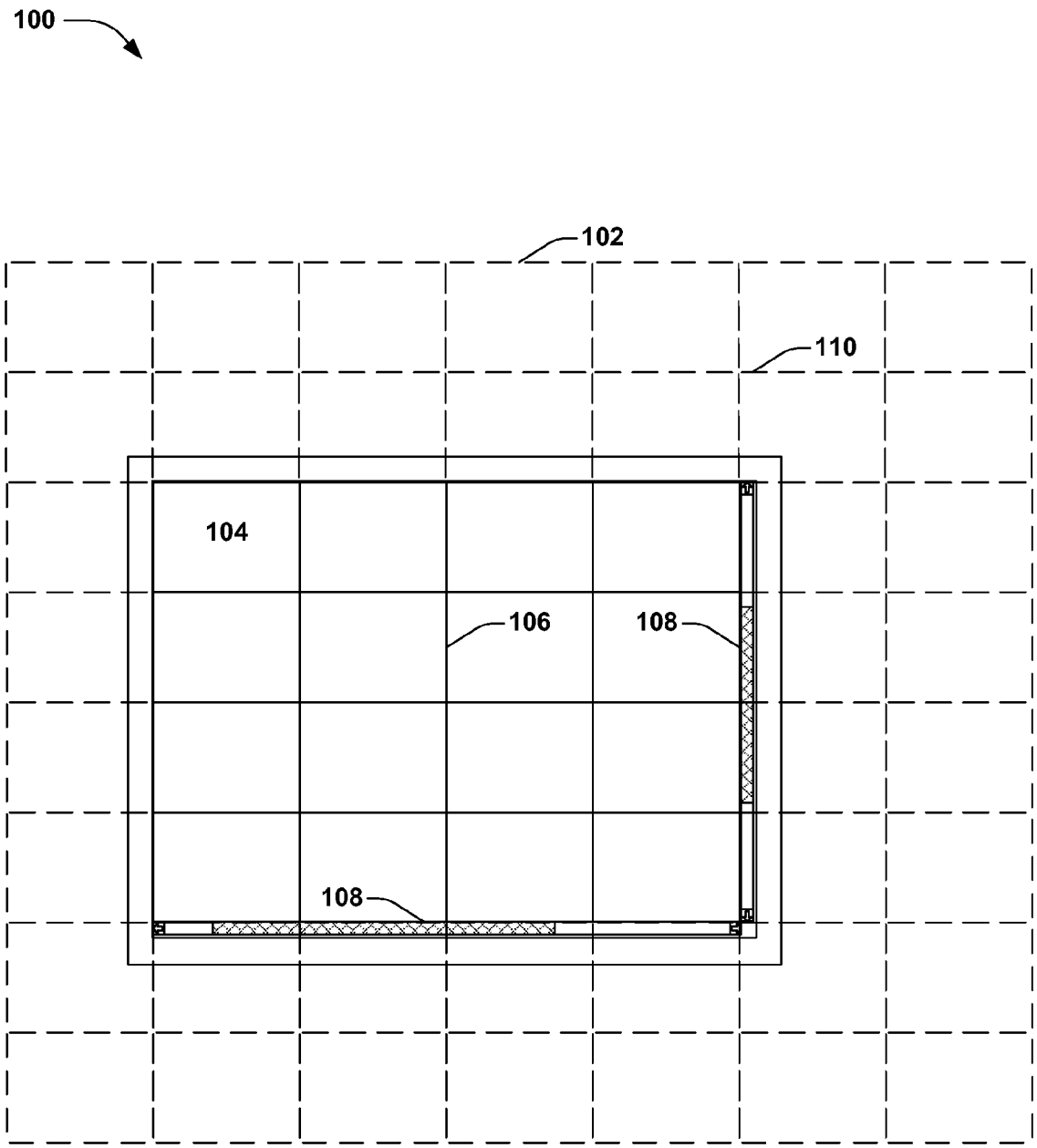
FIG. 1 is an illustration of an exemplary grid-view user interface control displaying realized and virtualized elements.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Some functions in a user interface (UI) element may require information about all items in a list, for example, regardless of whether they are represented in a viewport of a display (realized). As an example, a scroll bar may need to have a total height of all items in the list in order to present an appropriately sized slider control along a side of the display. When a UI element utilizes "virtualization" to account for items not realized, or items previously realized, for example, these virtualized items may not be instantiated by the UI, in order to preserve computer resources. When a system allows the UI element to have items of differing, non-uniform sizes a function, such as the scroll bar, may not perform as desired unless a dimension of virtualized items can be effectively determined.

For example, unlike typical spreadsheet UI documents, where a size of respective cells is known as part of a document, a UI element in a particular format can have items of differing sizes and, in this example, the items are not instantiated until realized. If a dimension of the different sized items is not known prior to the item being realized, for example, the scroll bar may jump in size and location as each item is realized. In this example, a size of respective items is not known by the UI element until it is asked to represent the item for display (e.g., the UI element is asked to measure respective items as they are displayed). Therefore, a total size of items not realized may not be known by the UI element.

FIG. 1 is an illustration of an exemplary grid-view user interface element 100 displaying realized and virtualized elements. In this example, respective cells in grid 102 are uniform in height and width; however, it will be appreciated that some systems may allow UI elements to have items of varying sizes. A screen shot display 104 of the exemplary grid-view user interface element 100 displays realized cells 106 of the grid 102. However, the grid 102 also contains virtualized cells 110 that are not displayed. In this example, the UI element comprises scroll bars 108 that can be used to show a user a location of the realized cells 106 within the grid 102. Using the scroll bars 108, a user can move the display 104 about the grid 102 to view other items in the grid 102.

In one aspect, a UI element may merely have an amount and a dimension of those items realized. For example, when a UI element is initiated it may only measure the dimension and number of those items within the initial display. In this example, information about the dimension and number of virtualized items may not be available until the UI element is asked to measure them (e.g., when a user scrolls to a different part of the item list). However, for example, if a user initiates the UI element, then moves to another area of a list, the UI element can store information concerning the dimension and number of items previously realized. Further, if the UI element can determine a viewport offset value, and an item index value for the first realized element in the viewport, an estimated dimension of virtualized items may be determined.

As an example, the exemplary grid-view UI element 100 in FIG. 1 illustrates a display 104 of realized items 106 beginning two rows down and one column across from a typical starting point for a display of this type. In this example, if the display 104 was initiated at a top right corner of the grid 102, then a user moved the display 104 to a position shown in the exemplary grid-view UI element 100, information about the virtualized items 110 in the top right corner of the gird 102 may be stored by the UI element 100.

Figure 2:
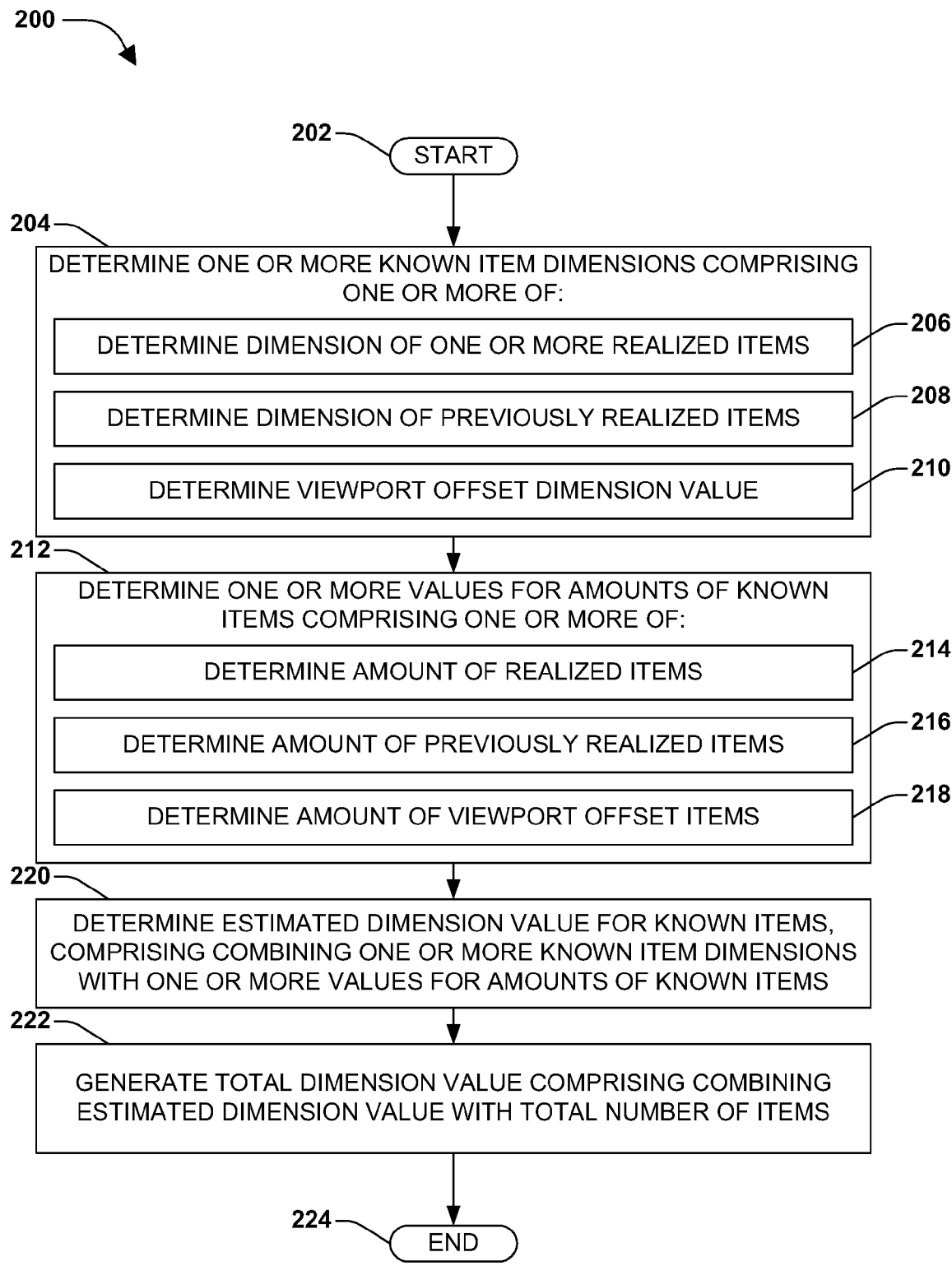
FIG. 2 is a flow chart illustrating an exemplary method of determining total dimension of items in computer-based user interface controls.

FIG. 2 is a flow chart illustrating an exemplary method 200 of determining total dimension of items in a UI element. The exemplary method 200 begins at 202 and involves determining one or more known item dimensions in the UI element at 204. Determining known item dimensions may comprise one or more of: determining a dimension of one or more realized items, at 206; determining a dimension of previously realized items, at 208; and determining a viewport offset dimension value at 210.

Figure 4:
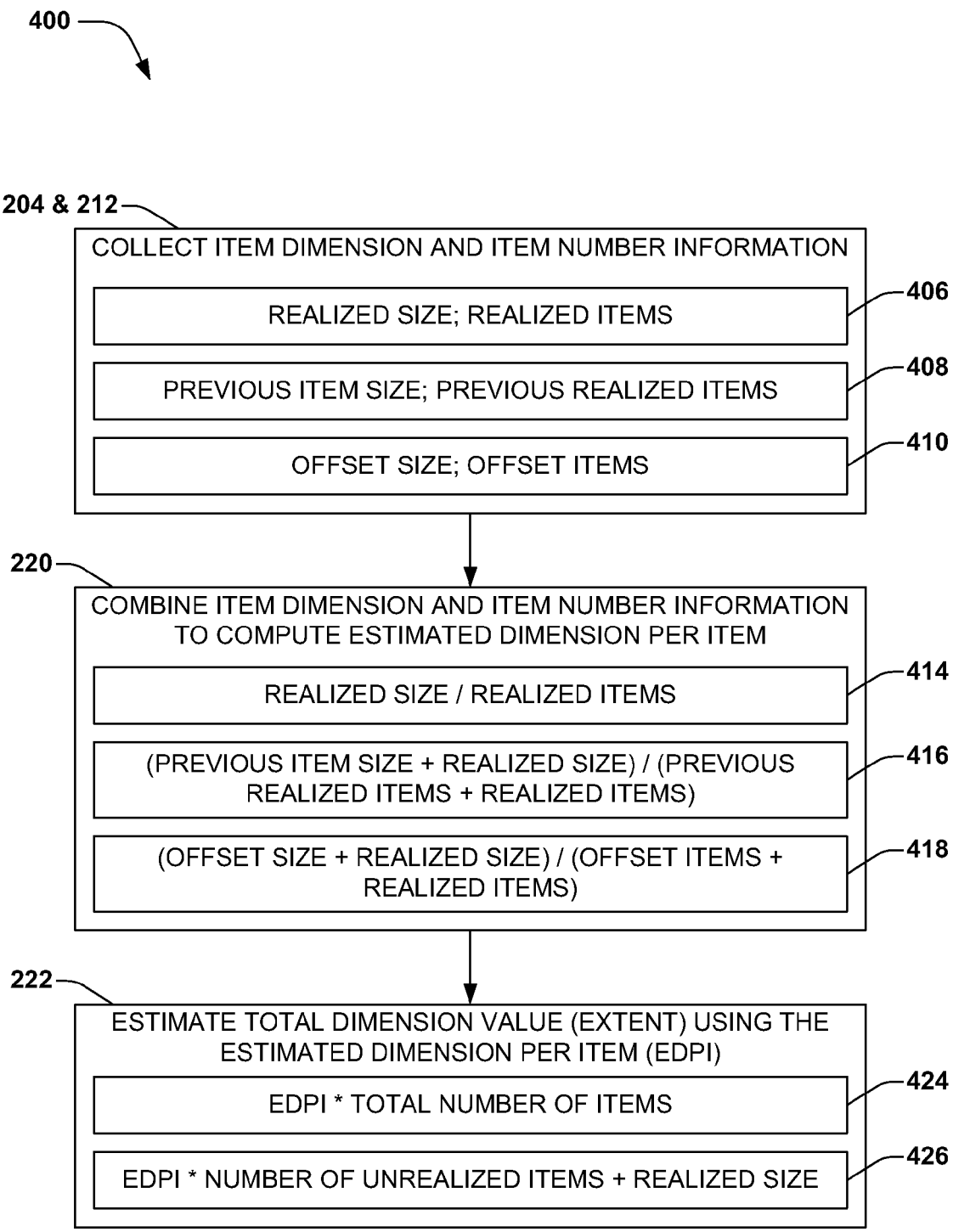
FIG. 4 is a flow chart illustrating an exemplary embodiment of a method of determining total dimension of items.

FIG. 4 illustrates one embodiment 400. In this embodiment 400 collecting viewport offset dimension values 410 can correspond to a dimension of virtualized items, for which the UI element did not store individual item dimension values (e.g., to save computing resources), but for which a measurement of the dimension can be determined. For example, if the UI element is attempting to determine a total vertical dimension of items in a list, and the virtualized items above the viewport have a total height of 80 pixels (e.g., as measured by the UI), the viewport offset value would be 80 pixels. It will be appreciated that, while this example utilizes items above the viewport for an offset value, the offset value items may be in any direction with respect to the viewport, using this technique.

As another example, in FIG. 1, if the UI element 100 wishes to determine a total vertical dimension of items in the grid 102, and the top two rows of the grid 102 have a viewport offset value of eighty pixels (e.g., the display has been scrolled down by eighty pixels), and the realized items 106 have a dimension value of one hundred pixels, the known dimension value can be determined by summing eighty pixels and one hundred pixels to obtain a value of one hundred and eighty pixels.

Further, in embodiment 400 of FIG. 4, the UI element may store individual dimension values for items that were previously realized 408. The stored information about these previously realized items may be used by this technique to determine a total dimension of items in a UI element. Additionally, the dimension of realized items may be determined by the UI element, for example, by measuring the dimensions of the viewport.

Turning back to FIG. 2, in the exemplary method 200, at 212, one or more values for amounts of known items may be determined. Determining values for amounts of known items may comprise one or more of: determining an amount of realized items, at 214; determining an amount of previously realized items, at 216; and determining an amount of viewport offset items, at 218.

In embodiment 400, an amount of viewport offset items may be determined by an item index value 410, which can correspond to a known numbered position of a first realized item in a series, for which the UI element has a stored number. As an example, a series of items may begin at a position with an index value of zero (0), and continue sequentially (e.g., a second position corresponds to an index value of one (1)). If the first realized item is at a third position, its corresponding item index value is two (2). It will be appreciated that, while this example utilizes an index value corresponding to a typical indexing scheme, using this technique the item index value can represent a known number of items in a series represented by the viewport offset dimension.

As an example, in FIG. 1, if the UI element 100 wished to determine a total vertical dimension of items in the grid 102, the number of vertical realized items in the grid is four. Further, in this example, the first realized item is at a third position, which corresponds to an item index value of two. Therefore, a known item index value can be determined by summing four items and two items, to obtain a result of six items.

Further, in embodiment 400, the number of previous realized items may be determined 408 by a value stored by the UI element corresponding to respective previously realized items. As an example, the UI element may store a number of items that have been previously realized in the viewport. Additionally, the number of realized items may be determined 406 by the UI element counting a number of realized items in the viewport.

Turning back to FIG. 2, in the exemplary method 200, at 220, an estimated dimension value for known items is determined, which comprises combining one or more known item dimensions with one or more values for amounts of known items. In embodiment 400 of FIG. 4, for example, if the UI element merely has information concerning the realized items, an estimated dimension value may be determined by calculating an average dimension value for the realized items 414 (e.g., five realized items with a total dimension value of one hundred pixels can yield an estimated dimension value of twenty pixels).

In embodiment 400, for example, the UI element may have also stored information concerning previously realized items. In this example, the dimension value for the realized items may be combined with the dimension value of the previously realized items, and the number of realized items may be combined with the number of previously realized items 416. The estimated dimension value of known items may be determined by calculating an average of the combined values (e.g., five realized items plus ten previously realized items, yields 15 items; divide this number into a combination of one hundred pixels for realized items and one hundred and forty pixels for previously realized items, yields an estimated dimension value of sixteen pixels).

Additionally, for example, the viewport offset values may be combined with the realized item values and/or the previously realized item values to determine the estimated dimension value 418. As an example, in FIG. 1, if the UI element 100 wishes to determine a total vertical dimension of items in the grid 102, and the known dimension value is one hundred and eighty pixels, and the known item value is six items, the average dimension value can be determined by dividing one hundred and eighty pixels by six items to obtain a result of thirty pixels per item.

It will be appreciated that, while the above examples utilize averages to determine an estimated dimension value, any applicable statistical operation may be utilized by this technique. For example, a modal value may be utilized as an estimated dimension value, whereby a most frequent item dimension of the determined item dimension values may be used. Further, a median value of the determined item dimension values may be used. Additionally, a weighted average value may be used, whereby, for example, the realized item dimension have a greater weight in determining the estimated dimension value for items in the UI element.

Turning back to FIG. 2, at 222, a total dimension value can be generated, which comprises combining (e.g., multiplying) the estimated dimension value and a total number of items in the UI element (e.g., in the list). In embodiment 400 of FIG. 4, the estimated dimension value can be multiplied by a total number of items in the series 424 to yield the estimated total dimension value for the series of items.

As another example, in FIG. 1, if the UI element 100 may wish to determine a total vertical dimension of items in the grid 102. In this example, using values described above, if the pixel offset value and the item index value is known, the grid 102 may have an average dimension value of thirty pixels per item. If the total number of items in the grid is eight items, we can determine the total dimension value of the horizontal items by multiply thirty pixels per item by eight items to obtain a result of two hundred and forty pixels (e.g., thirty pixels/item×eight items=two hundred and forty pixels).

In embodiment 400, for example, the total dimension value may be generated by combining (e.g., summing) the dimension of the known items, with a combination (e.g., product) of the estimated item dimension and a number of unrealized items 424. As an example, estimated dimension value for known items in the series may be multiplied by the number of items that have never been realized by the UI element. In this example, the resulting product can be summed with the dimension value of the known items (e.g., summing of the dimensions of respective known items), which yields an estimated total dimension value for the series of items in the UI element. Having determined the total dimension value, the exemplary method 200 ends at 224.

In another aspect, if the viewport offset value and the viewport offset item value is not known, and/or the values for previously realized items is not known, the UI element may merely be able to use information about realized items for estimating a total dimension for a series of items. As an example, in FIG. 1, the grid 102 may have an average dimension value of twenty-five pixels per item. In this example, we can determine the total dimension value of the horizontal items by multiply twenty-five pixels per item by eight items to obtain a result of two hundred pixels (e.g., 25 pixels/item×8 items=200 pixels).

In this aspect, as can be shown by the above examples, when the UI element has information concerning the realized items and those that were previously realized (e.g., either as a viewport offset or previously represented items with stored off information), a more accurate estimate of the total dimension value for a series of items may be determined. In this way, the techniques and systems, described herein, can continually refine the total dimension value for a series of items as more items are realized (e.g., developing a weighted average as new information is realized).

For example, a UI element may use a scroll bar along a side of a display, allowing a user to scroll vertically within a list of non-uniformly sized items. In this example, as the user begins scrolling down from a top position, the dimensions of items that are realized as the user scrolls are stored by the UI element. This stored information, along with the information about the realized items can be used by the UI to continually update a total dimension value for the vertical list of items. Therefore, the UI element can update the scroll bar to indicate an appropriate location and shape of a slider control in the scroll bar.

Figure 3:
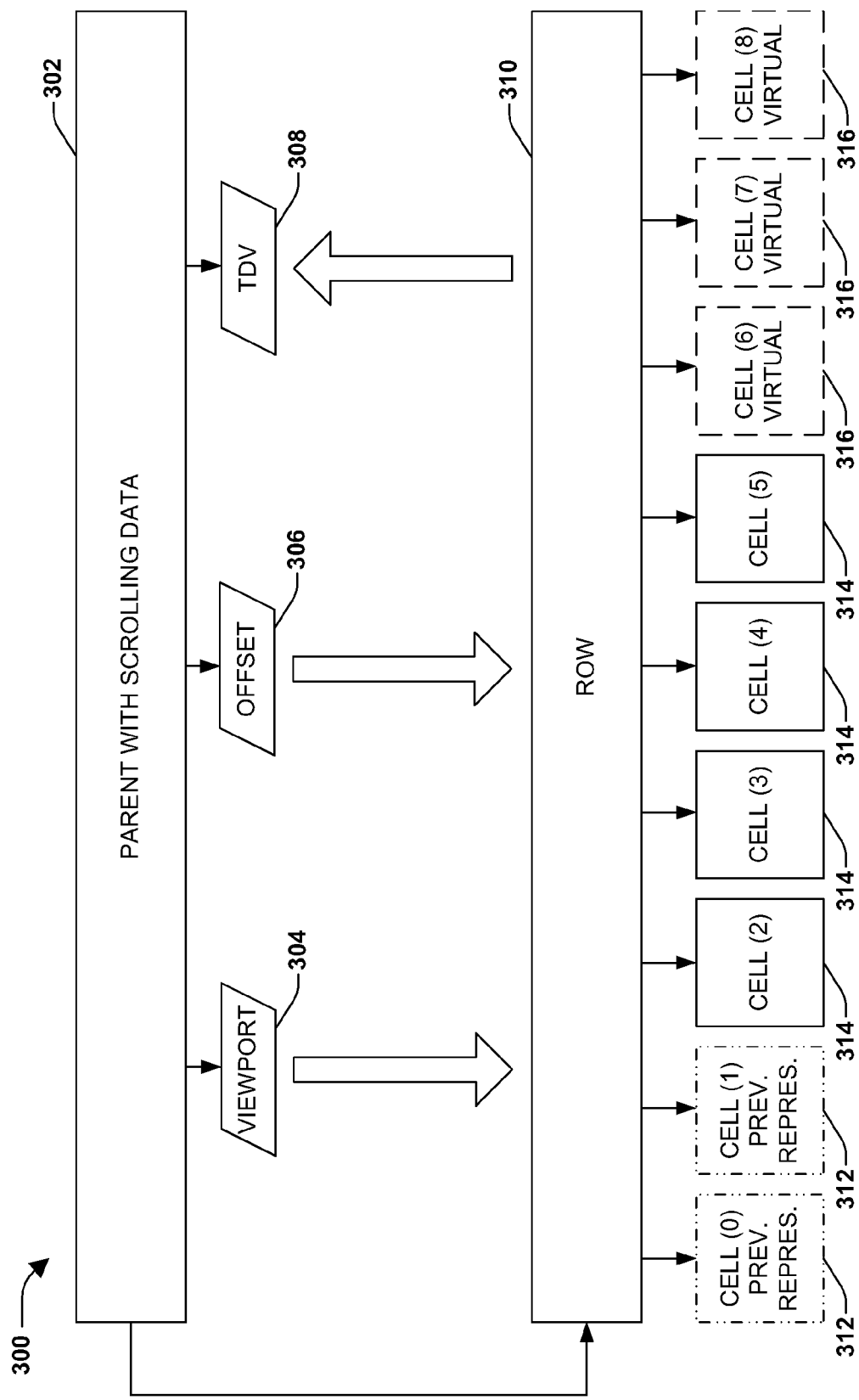
FIG. 3 is a block diagram illustrating an exemplary embodiment of a method of determining total dimension of items.

FIG. 3 is a block diagram illustrating an exemplary embodiment 300 of a method of determining total dimension of non-uniform items, such that item dimension and index information may be continually updated. A parent control 302 of a UI element has ownership of (e.g., contains) a child control row of items 310. In this embodiment, the row 310 has ownership of (e.g., contains) cells 312, 314, and 316, which can be items of varying, non-uniform width. The parent control 302 can utilize and maintain scrolling data, which may be presented as a scroll bar on a display. In this embodiment, the parent control 302 communicates viewport information 304 to the child control 310, which comprises a location and dimension of a display, so that the child control may know which items are to be realized 314. Further, the parent control 302 communicates offset values (e.g., viewport offset value and viewport offset item values) to the child control 310, which may comprise a dimension and number of previously realized items 312. As a user scrolls across the row 310, updated viewport information 304 and offset information 306 is sent to the child control 310.

In the exemplary embodiment 300, the child control 310 has information on a total number of items, which comprises the previously realized cells 312, the realized cells 314, and the virtualized cells 316. The child control combines this total with the updated viewport information 304 and offset information 306, to calculate a total dimension value 308 for the row 310. The child control row 310 communicates the total dimension value 308 back to the parent control 302. The parent control 302 can use the viewport information 304, offset information 306, and total dimension value 308, for example, to present an appropriate size and location of a slider in the scroll bar. As the user continues to scroll across the row 310, updated information can allow the parent control 302 to update the scroll bar.

Figure 5:
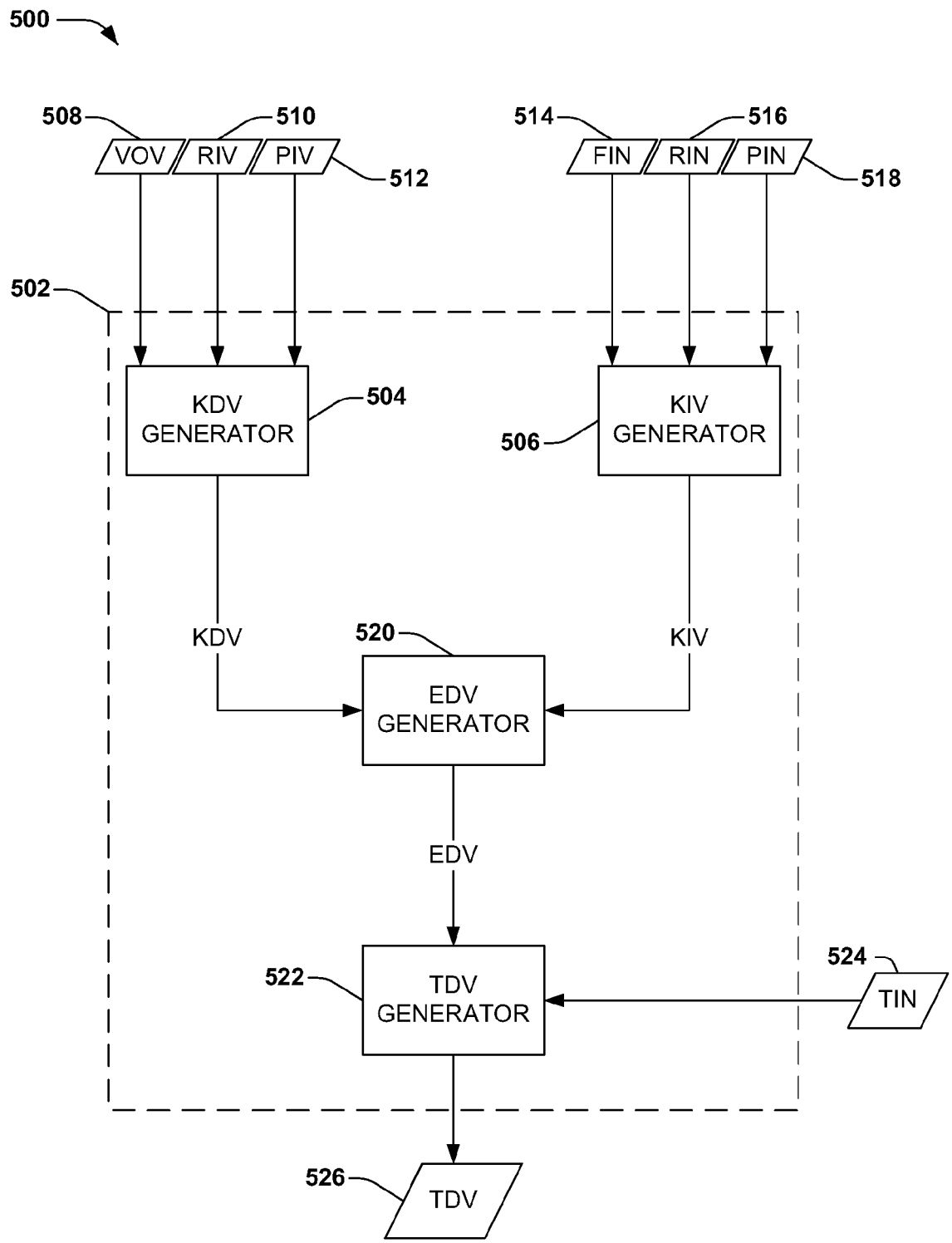
FIG. 5 is a component block diagram illustrating an exemplary system for determining total dimension of items in computer-based user interface controls.

A system may be devised for determining an estimated total dimension of items in a computer-based user interface control. FIG. 5 is a component block diagram illustrating an exemplary system 500 for determining total dimension of, for example, non-uniform items in computer-based user interface controls. It will be appreciated that, while this embodiment, illustrate components of the exemplary system 500 comprised within a single element 502, the system is not limited to having its component comprised within a single element or control (e.g., a control in a user interface element). It is anticipated that those skilled in the art may devise systems whereby the components are comprised in various elements or controls.

In the exemplary embodiment 500, an element 502 comprises a known dimension value generator 504, which is configured to generate a known dimension value using (e.g., summing) one or more of a viewport offset value 508, a realized item dimension value 510, and a previously realized item dimension value 512. In this exemplary system 500, for example, the viewport offset value 508 may correspond to a dimension value of items that have been virtualized by a user interface (UI) element, and for which a dimension value may be determined. Further, the realized item dimension value 510 may correspond to a total dimension value of all realized items. Additionally, the previously realized item dimension value 512 may correspond to a dimension value of items that were previously realized by the UI element, and for which dimension and item number information has been stored off by the UI element. As an example, information about a width of previously realized items may be stored by the UI element, which may be represented as a number of pixels. Further, the UI element may measure a width of realized items, which may also be represented as a number of pixels. In this example, the known dimension value generator 504 can combine these two pixel values to generate a known dimension value.

The element 502 in the exemplary embodiment 500, further comprises a known item value generator 506, which is configured to generate a known item value using (e.g., summing) one or more of an amount of viewport offset items 514, an amount of realized items 516, and an amount of previously represented items 518. In this exemplary system 500, the amount of viewport offset items 514 may correspond to an index value of a first realized item. As an example, the first realized item may have an index value of two (e.g., which indicates a third position in series: first position (0); second position (1); third position (2)), and there may be four realized items. In this example, the known item value generator can sum the item index value and the amount of realized items 516 to generate a known item value of six.

However, in one embodiment, if the viewport offset value 508 and/or the number of viewport offset items 514 is not available, and/or the previously realized item dimension value 512 and the amount of previously represented items 518 (e.g., either values are zero or are unknown), the known dimension value generator 504 can generate a known dimension value equal to the realized item dimension value 510 (e.g., as if the pixel offset value is equal to zero). Further, in this embodiment, the known item value generator 506 can generate a known item value equal to the amount of realized items 516 (e.g., as if the item index number is equal to zero).

The element 502 in the exemplary embodiment 500, further comprises an estimated dimension value generator 520, which is configured to combine (e.g., produce a quotient value for) the known dimension value generated by the known dimension value generator 504 and the known item value generated by the known item value generator 506. As an example, the estimated dimension value generator 520 may divide the known dimension value by the known item value to produce an estimated dimension value for items in a series.

It will be appreciated that, while an average item dimension value may be used as the estimated dimension value, the techniques and systems, described herein, are not limited to using an average. Other statistical operations may be used to determine an estimated dimension value of items in a series. For example, a modal value may be utilized as an estimated dimension value, whereby a most frequent item dimension of the determined item dimension values may be used. Further, a median value of the determined item dimension values may be used. Additionally, a weighted average value may be used, whereby, for example, the realized item dimension have a greater weight in determining the estimated dimension value for items in the UI element.

The element 502 in the exemplary embodiment 500 further comprises a total dimension value generator 522, which is configured to generate a total dimension value 526. In one embodiment the total dimension value generator 522 may combine (e.g. multiply) the estimated dimension value generated by the average dimension value generator 520 and a total item number 524. As an example, the total item number 524 may represent a number of items in a series, as determined by a child control (e.g., a row) in a UI element. The total dimension value generator 522 can multiply the estimated dimension value by the total item number 524, to obtain a resulting total dimension value 526 for the series of items in the child control. In this example, the total dimension value 526 may be sent to a parent control in the UI element to be used to present an appropriate scroll bar on a display.

Figure 6:
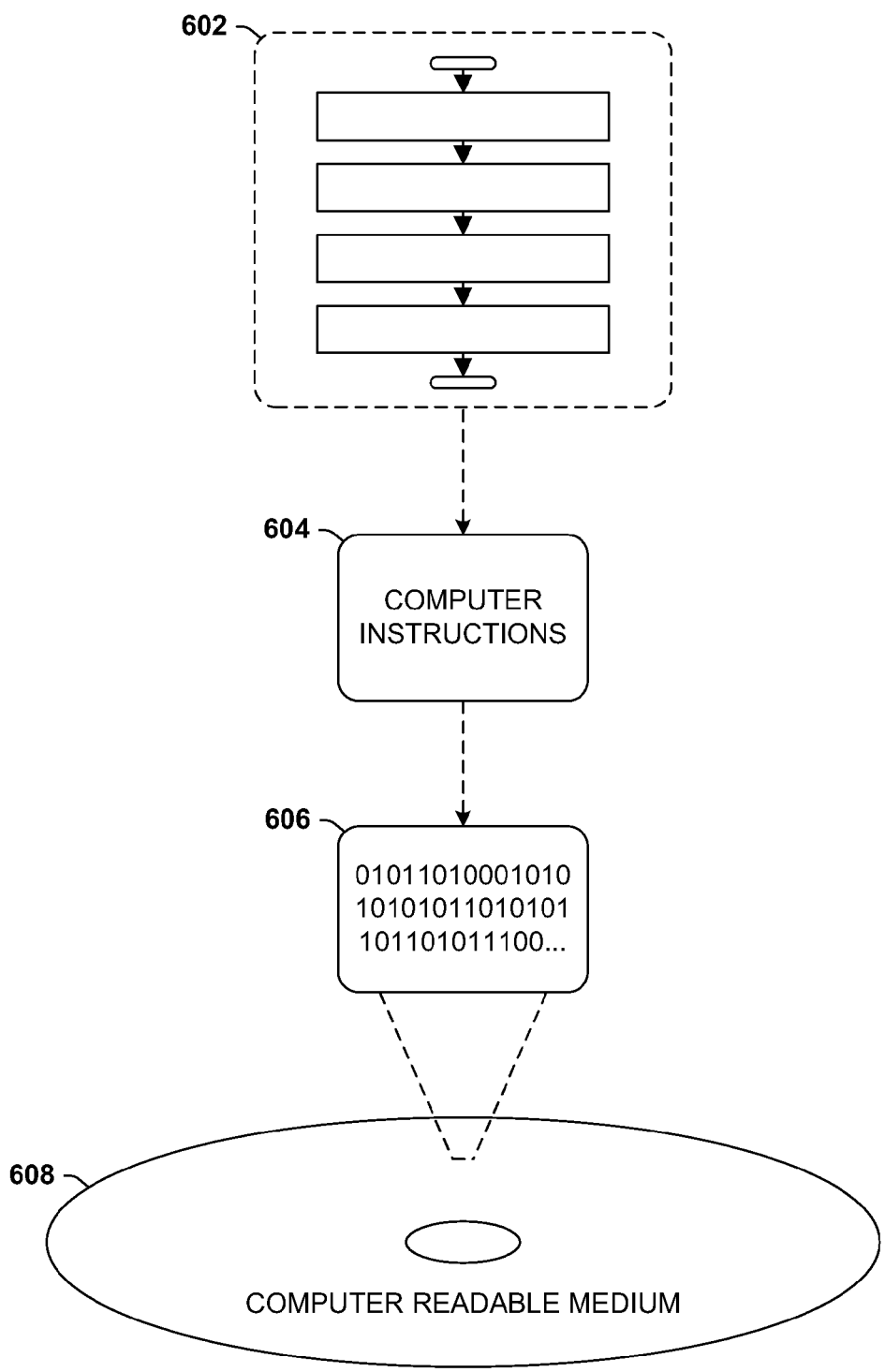
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 600, the processor-executable instructions 604 may be configured to perform a method 602, such as the exemplary method 200 of FIG. 2, for example. In another such embodiment, the processor-executable instructions 604 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
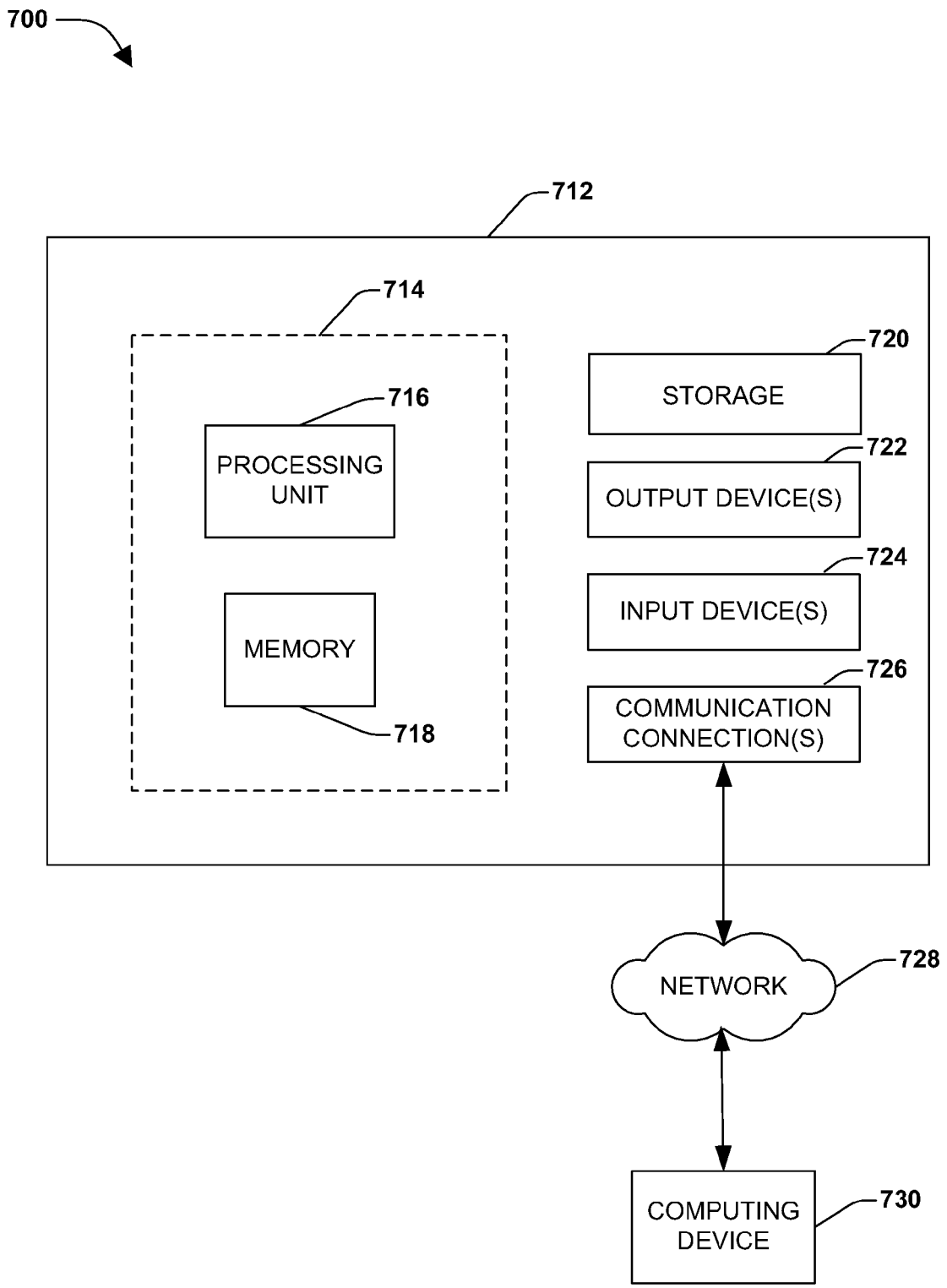
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for determining a total dimension of items in a computer-based user interface control, the method comprising:
   determining one or more item dimensions comprising:
      determining respective dimensions of one or more realized items;
      determining respective dimensions of one or more previously realized items; and
      determining a viewport offset dimension value for one or more viewport offset items;
   determining one or more amounts of at least some of the items comprising:
      determining an amount of realized items;
      determining an amount of previously realized items; and
      determining an amount of viewport offset items;
   determining an estimated dimension value for at least some of the items, comprising combining one or more of the item dimensions with one or more of the amounts of at least some of the items, determining the estimated dimension value comprising at least one of:
      determining an average dimension value for at least some of the items;
      determining a modal dimension value for at least some of the items; and
      determining a median dimension value for at least some of the items; and
   generating a total dimension value comprising combining the estimated dimension value with a total number of items, at least some of the method implemented at least in part via a processing unit.

2. The method of claim 1, determining one or more item dimensions comprising one or more of:
   determining a height value of one or more respective items; and
   determining a width value of one or more respective items.

3. The method of claim 1, comprising dividing at least some of the item dimensions by at least some of the amounts of items.

4. The method of claim 1 determining an average dimension value comprising determining a weighted average.

5. The method of claim 1, combining the estimated dimension value with a total number of items comprising multiplying the estimated dimension value by the total number of items.

6. The method of claim 1, determining a viewport offset dimension value comprising retrieving a combined dimension value for at least some of the previously realized items.

7. The method of claim 1, determining the amount of viewport offset items based at least in part on the viewport offset dimension value.

8. The method of claim 1, respective dimensions of one or more realized items based at least in part on a parent portion of a control.

9. The method of claim 1, generating a total dimension value comprising combining a known extent dimension with the estimated dimension value and a number of unknown dimension items.

10. The method of claim 9, the known extent dimension comprising one or more of:
    at least some of the realized items;
    at least some of the viewport offset items; and
    at least some of the previously realized items.

11. The method of claim 9, the number of unknown dimension items comprising a number of items for which a dimension value is not known.

12. The method of claim 1, the total number of items comprising a number of items in a series.

13. The method of claim 12, the series comprising one or more of:
    one or more columns; and
    one or more rows.

14. The method of claim 1, the user interface control comprising one or more of:
    a list-box control user interface;
    a data-grid control user interface; and
    a tree-view control user interface.

15. A system for determining a total dimension of items in a computer-based user interface control, comprising:
    an unrealized item determining component configured to determine a number of unrealized items;
    a dimension value generator, configured to generate a dimension value from:
       a viewport offset dimension value;
       a previously realized item dimension value; and
       a realized item dimension value;

an item value generator, configured to generate an item value from:
  a number of viewport offset items;
  a number of previously realized items; and
  a number of realized items;
an estimated item dimension value generator, configured to combine the dimension value and the item value and generate an estimated dimension value, the combining comprising at least one of:
  determining an average dimension value for at least some of the items;
  determining a modal dimension value for at least some of the items; and
  determining a median dimension value for at least some of the items; and
a total dimension value generator, configured to generate a total dimension value by combining the estimated dimension value with a total number of items, the total number of items including at least some of the unrealized items,
at least some of at least one of the unrealized item determining component, dimension value generator, item value generator, estimated item dimension value generator, and total dimension value generator implemented at least in part via a processing unit.

16. The system of claim 15, comprising at least one of:
the dimension value generator, configured to sum a viewport offset dimension value, a previously realized item dimension value, and a realized item dimension value; or
the item value generator, configured to sum a number of viewport offset items, a number of previously realized items, and a total number of realized items.

17. The system of claim 15, the estimated item dimension value generator, configured to divide the dimension value by the item value.

18. The system of claim 15, the total dimension value generator, configured to perform at least one of:
  combining the estimated dimension value and the total number of items; and
  combining the estimated dimension value, a number of unrealized items, and the realized item dimension value.

19. The system of claim 15, the estimated item dimension value generator configured to generate the estimated dimension value based at least in part on a weighted average.

20. A computer-readable storage medium comprising computer executable instructions that when executed via one or more processing units perform a method for determining a total dimension of items in a computer-based user interface control, comprising:
determining one or more dimensions of at least some of the items comprising:
  determining respective dimensions of one or more realized items;
  determining respective dimensions of one or more previously realized items; and
  determining a viewport offset dimension value for one or more viewport offset items;
determining one or more numbers of at least some of the items comprising:
  determining a number of realized items;
  determining a number of previously realized items; and
  determining a number of viewport offset items;
determining an estimated dimension value for at least some of the items, comprising combining one or more dimensions of at least some of the items with one or more numbers of at least some of the items, the combining comprising at least one of:
  determining an average dimension value for at least some of the items;
  determining a weighted average dimension value for at least some of the items;
  determining a modal dimension value for at least some of the items; and
  determining a median dimension value for at least some of the items; and
generating a total dimension value comprising at least one of:
  multiplying the estimated dimension value by a total number of items; and
  combining a known extent dimension with the estimated dimension value and a number of unknown dimension items.

* * * * *

UNITED STATES PATENT AND TRADEMARK OFFICE
CERTIFICATE OF CORRECTION

PATENT NO. : 8,156,425 B2  Page 1 of 1
APPLICATION NO. : 12/132618
DATED : April 10, 2012
INVENTOR(S) : Benjamin F. Carter et al.

It is certified that error appears in the above-identified patent and that said Letters Patent is hereby corrected as shown below:

In column 12, line 18, in Claim 4, after "1" insert -- , --.

Signed and Sealed this
Ninth Day of October, 2012

David J. Kappos
*Director of the United States Patent and Trademark Office*